(12) United States Patent
Zhu et al.

(10) Patent No.: US 7,368,200 B2
(45) Date of Patent: May 6, 2008

(54) COMPOSITE POLYMER ELECTROLYTE MEMBRANES AND ELECTRODE ASSEMBLIES FOR REDUCING FUEL CROSSOVER IN DIRECT LIQUID FEED FUEL CELLS

(75) Inventors: Yimin Zhu, Saint Louis, MO (US); Ruiming Zhang, Urbana, IL (US); Nona DeCastro, Chicago, IL (US); Bogdan Gurau, Urbana, IL (US); Sharon Blair, Coquitlam (CA)

(73) Assignee: Tekion, Inc., Burnaby, BC (CA)

( * ) Notice: Subject to any disclaimer, the term of this patent is extended or adjusted under 35 U.S.C. 154(b) by 0 days.

(21) Appl. No.: 11/323,490

(22) Filed: Dec. 30, 2005

(65) Prior Publication Data
US 2007/0154760 A1 Jul. 5, 2007

(51) Int. Cl.
*H01M 4/00* (2006.01)
*B01J 49/00* (2006.01)
*C08J 5/20* (2006.01)
*H01B 1/00* (2006.01)
*H01B 1/12* (2006.01)

(52) U.S. Cl. .......................... 429/41; 521/27; 252/500
(58) Field of Classification Search ................. 521/27; 429/41; 252/500; 428/192, 195.1, 198, 428/201
See application file for complete search history.

(56) References Cited

U.S. PATENT DOCUMENTS

| | | |
|---|---|---|
| 5,350,643 A | 9/1994 | Imahashi et al. |
| 5,464,700 A | 11/1995 | Steck et al. |
| 5,484,577 A | 1/1996 | Buswell et al. |
| 5,804,326 A | 9/1998 | Chow et al. |
| 5,888,667 A | 3/1999 | Cheong et al. |
| 5,958,616 A | 9/1999 | Salinas et al. |
| 6,020,083 A | 2/2000 | Breault et al. |
| 6,156,449 A | 12/2000 | Zuber et al. |
| 6,159,628 A | 12/2000 | Grasso et al. |

(Continued)

FOREIGN PATENT DOCUMENTS

CA   2 320 210 A1   8/1999

(Continued)

OTHER PUBLICATIONS

D. H. Jung, S.Y Cho, D. H. Peck, D. R. Shin, J. S. Kim, *J. Power Sources* 106 (2002) 173.

(Continued)

*Primary Examiner*—Gregg Cantelmo
*Assistant Examiner*—Eugenia Wang
(74) *Attorney, Agent, or Firm*—McAndrews, Held & Malloy, Ltd.

(57) ABSTRACT

A composite proton exchange membrane includes first and second outer proton exchange membrane layers each having an exterior peripheral portion. An inner proton exchange membrane layer is interposed between the first and second outer membrane layers. The inner membrane layer has an exterior peripheral portion encompassed within each of the outer membrane layer peripheral portions. A substantially fluid-impermeable edge bonding film is interposed between the first and second outer membrane layers. The edge bonding film circumscribes the inner membrane layer peripheral portion and is disposed within each of the outer membrane layer peripheral portions. The edge bonding film cooperates with the first and second outer membrane layers to encapsulate the inner layer.

23 Claims, 8 Drawing Sheets

U.S. PATENT DOCUMENTS

| | | |
|---|---|---|
| 6,183,898 B1 | 2/2001 | Koschany et al. |
| 6,187,466 B1 | 2/2001 | Schroll et al. |
| 6,207,312 B1 | 3/2001 | Wynne et al. |
| 6,235,166 B1 | 5/2001 | Towe et al. |
| 6,236,166 B1 | 5/2001 | Chou et al. |
| 6,256,449 B1 | 7/2001 | Eto |
| 6,261,711 B1 | 7/2001 | Matlock et al. |
| 6,306,530 B1 | 10/2001 | Blondin et al. |
| 6,309,772 B1 | 10/2001 | Zuber et al. |
| 6,352,742 B1 | 3/2002 | Murata et al. |
| 6,355,371 B1 | 3/2002 | Farkash et al. |
| 6,387,557 B1 | 5/2002 | Krasij et al. |
| 6,399,234 B2 | 6/2002 | Bonk et al. |
| 6,423,437 B1 | 7/2002 | Kenyon et al. |
| 6,423,439 B1 | 7/2002 | Barton et al. |
| 6,465,136 B1 | 10/2002 | Fenton et al. |
| 6,528,194 B1 | 3/2003 | Condit et al. |
| 6,692,860 B2 | 2/2004 | Inoue et al. |
| 6,696,191 B2 | 2/2004 | Washima |
| 6,699,613 B2 | 3/2004 | Inoue et al. |
| 6,730,426 B2 | 5/2004 | Wangerow |
| 6,759,016 B2 | 7/2004 | Sederquist et al. |
| 6,783,878 B2 | 8/2004 | Voss et al. |
| 6,797,422 B2 | 9/2004 | Fan et al. |
| 6,844,101 B2 | 1/2005 | Lee et al. |
| 6,861,171 B1 | 3/2005 | Suzuki |
| 6,861,173 B2 | 3/2005 | Bhaskar et al. |
| 6,866,952 B2 | 3/2005 | Corey et al. |
| 6,893,764 B2 | 5/2005 | Koyama et al. |
| 6,893,767 B2 | 5/2005 | Hatano et al. |
| 6,929,765 B2 | 8/2005 | Cotton et al. |
| 6,946,211 B1 | 9/2005 | Bjerrum et al. |
| 2002/0094464 A1 | 7/2002 | Wangerow |
| 2002/0127474 A1 | 9/2002 | Fleischer et al. |
| 2002/0160271 A1 | 10/2002 | Frech et al. |
| 2003/0096149 A1 | 5/2003 | Koyama et al. |
| 2003/0118890 A1 | 6/2003 | Wittpahl et al. |
| 2003/0158273 A1 | 8/2003 | Kosako et al. |
| 2003/0235737 A1 | 12/2003 | Jeon et al. |
| 2003/0235744 A1* | 12/2003 | Pflaesterer .................. 429/35 |
| 2004/0028973 A1 | 2/2004 | Pan et al. |
| 2004/0028977 A1 | 2/2004 | Pickup et al. |
| 2004/0053099 A1 | 3/2004 | Franklin et al. |
| 2004/0091767 A1 | 5/2004 | Zuber et al. |
| 2004/0115518 A1 | 6/2004 | Masel et al. |
| 2004/0126638 A1 | 7/2004 | Chen et al. |
| 2004/0134780 A1 | 7/2004 | Inoue et al. |
| 2004/0170883 A1 | 9/2004 | Bartholomeyzik et al. |
| 2004/0197638 A1 | 10/2004 | McElrath et al. |
| 2004/0209154 A1 | 10/2004 | Ren et al. |
| 2004/0214064 A1 | 10/2004 | Cavalca et al. |
| 2004/0241529 A1 | 12/2004 | Hirsch et al. |
| 2004/0247963 A1 | 12/2004 | Akiyama et al. |
| 2005/0031930 A1 | 2/2005 | Koyama et al. |
| 2005/0074651 A1 | 4/2005 | Kidai et al. |
| 2005/0077233 A1 | 4/2005 | Hedhli et al. |
| 2005/0100776 A1 | 5/2005 | Brunk et al. |
| 2005/0116206 A1 | 6/2005 | Kakuta et al. |
| 2005/0142433 A1 | 6/2005 | Ueda et al. |
| 2005/0170236 A1 | 8/2005 | Watanabe et al. |
| 2005/0186460 A1 | 8/2005 | Kanaoka et al. |
| 2005/0208366 A1 | 9/2005 | Rohwer et al. |
| 2005/0214631 A1 | 9/2005 | Hirashige |
| 2005/0238943 A1 | 10/2005 | Akiyama et al. |

FOREIGN PATENT DOCUMENTS

| | | |
|---|---|---|
| EP | 0983134 B1 | 1/2002 |
| EP | 1278260 A1 | 1/2003 |
| EP | 1296398 A2 | 3/2003 |
| EP | 1135821 B1 | 6/2003 |
| EP | 1318559 A2 | 6/2003 |
| EP | 1347527 A2 | 9/2003 |
| EP | 1494306 A1 | 1/2005 |
| EP | 1505120 A1 | 2/2005 |
| EP | 1523053 A2 | 4/2005 |
| JP | 56021605 A2 | 2/1981 |
| JP | 2000357524 A * | 12/2000 |
| JP | 2004079266 A2 | 3/2004 |
| JP | 2005190780 A2 | 7/2005 |
| WO | WO9813891 A1 | 4/1998 |
| WO | WO9852732 A1 | 11/1998 |
| WO | WO0066652 A1 | 11/2000 |
| WO | WO0118894 A2 | 3/2001 |
| WO | WO0154220 A2 | 7/2001 |
| WO | WO0193361 A2 | 12/2001 |
| WO | WO02054515 A2 | 7/2002 |
| WO | WO02058180 A1 | 7/2002 |
| WO | WO02091502 A2 | 11/2002 |
| WO | WO02097420 A1 | 12/2002 |
| WO | WO2004001876 A2 | 12/2003 |
| WO | WO2004004053 A2 | 1/2004 |
| WO | WO2004015804 A2 | 2/2004 |
| WO | WO2004051782 A1 | 6/2004 |
| WO | WO2004109837 A2 | 12/2004 |
| WO | WO2004114451 A1 | 12/2004 |
| WO | WO2005001966 A2 | 1/2005 |
| WO | WO2005029609 A2 | 3/2005 |
| WO | WO2005034270 A1 | 4/2005 |
| WO | WO2005035247 A2 | 4/2005 |

OTHER PUBLICATIONS

P. Staiti, A.S. Arico, V. Baglio, F. Lufrano, V. Antonucci, *Solid State Ionics* 145 (2001) 101.

Z.Q. Ma, P. Cheng, T.S. Zhao, *J. Memb. Sci.* 215 (2003) 327.

J. Liu, H. Wang, S. Cheng, K. Chan, *Chem. Commun.* 2004, 728.

P.D. Beattie, F. P. Orfino, V. I. Basura, K. Zychowska, J. Ding, C. Chuy, J. Schmeisser, S. Holdcroft, *J. Electroanal. Chem.* 503 (2001) 45.

* cited by examiner

COMPOSITE POLYMER ELECTROLYTE MEMBRANES AND ELECTRODE ASSEMBLIES FOR REDUCING FUEL CROSSOVER IN DIRECT LIQUID FEED FUEL CELLS

FIELD OF THE INVENTION

The present invention relates to chemically-modified electrolyte membranes and integral multi-layered polymer electrolyte membranes for applications in fuel cells. The present invention further relates to polymer electrolyte membranes and membrane configurations to reduce liquid fuel crossover with minimal effects on fuel cell performance.

BACKGROUND OF INVENTION

Fuel cells are electrochemical cells in which a free energy change resulting from a fuel oxidation reaction is converted into electrical energy. Applications for fuel cells include battery replacement, mini- and microelectronics such as portable electronic devices, sensors such as gas detectors, seismic sensors, and infrared sensors, electromechanical devices, automotive engines and other transportation power generators, power plants, and many others. One advantage of fuel cells is that they are substantially pollution-free.

Electrochemical fuel cells convert fuel and oxidant fluid streams to electricity and reaction product. Solid polymer electrolyte fuel cells generally employ a membrane electrode assembly (MEA) comprising a solid polymer electrolyte or ion-exchange membrane disposed between two porous electrically conductive electrode layers. An electrocatalyst is typically disposed at each membrane/electrode layer interface to induce the desired electrochemical reaction.

The electrode substrate typically comprises a sheet of porous, electrically conductive material, such as carbon fiber paper or carbon cloth. The layer of electrocatalyst is typically in the form of finely committed metal, such as platinum, palladium, or ruthenium, and is disposed on the surface of the electrode substrate at the interface with the membrane electrolyte in order to induce the desired electrochemical reaction. In a single cell, the electrodes are electrically coupled to provide a path for conducting electrons between the electrodes through an external load.

The fuel stream directed to the anode by a fuel flow field migrates through the porous anode and is oxidized at the anode electrocatalyst layer. The oxidant stream directed to the cathode by an oxidant flow field migrates through the porous cathode and is reduced at the cathode electrocatalyst layer.

Electrochemical fuel cells can employ gaseous fuels and oxidants, for example, those operating on molecular hydrogen as the fuel and oxygen in air or a carrier gas (or substantially pure oxygen) as the oxidant. In hydrogen fuel cells, hydrogen gas is oxidized to form water, with a useful electrical current produced as a byproduct of the oxidation reaction. A solid polymer membrane electrolyte layer can be employed to separate the hydrogen fuel from the oxygen. The anode and cathode are arranged on opposite faces of the membrane. Electron flow along the electrical connection between the anode and the cathode provides electrical power to load(s) interposed in circuit with the electrical connection between the anode and the cathode. The anode and cathode reactions in hydrogen/oxygen fuel cells are shown in the following equations:

Anode reaction: $H_2 \rightarrow 2H^+ + 2e^-$

Cathode reaction: $\frac{1}{2}O_2 + 2H^+ + 2e^- \rightarrow H_2O$

The catalyzed reaction at the anode produces hydrogen cations (protons) from the fuel supply. The ion-exchange membrane facilitates the migration of protons from the anode to the cathode. In addition to conducting protons, the membrane isolates the hydrogen-containing gaseous fuel stream from the oxygen-containing gaseous oxidant stream. At the cathode electrocatalyst layer, oxygen reacts with the protons that have crossed the membrane to form water as the reaction product. Hydrogen fuel cells are impractical for many applications, however, because of difficulties related to storing and handling hydrogen gas.

Organic fuel cells can prove useful in many applications as an alternative to hydrogen fuel cells. In an organic fuel cell, an organic fuel such as methanol or formic acid is oxidized to carbon dioxide at an anode, while air or oxygen is simultaneously reduced to water at a cathode. One advantage over hydrogen fuel cells is that organic/air fuel cells can be operated with a liquid organic fuel. This diminishes or eliminates problems associated with hydrogen gas handling and storage. Some organic fuel cells require initial conversion of the organic fuel to hydrogen gas by a reformer. These are referred to as "indirect" fuel cells. The presence of a reformer increases cell size, cost, complexity, and start up time. Other types of organic fuel cells, called "direct," eliminate these disadvantages by directly oxidizing the organic fuel without conversion to hydrogen gas. To date, fuels employed in direct organic fuel cell development methanol and other alcohols, as well as formic acid and other simple acids.

In fuel cells of this type the reaction at the anode produces protons, as in the hydrogen/oxygen fuel cell described above, however the protons (along with carbon dioxide) arise from the oxidation of the organic fuel, such as formic acid. An electrocatalyst promotes the organic fuel oxidation at the anode. The organic fuel can alternatively be supplied to the anode as vapor, but it is generally advantageous to supply the organic fuel to the anode as a liquid, preferably as an aqueous solution. The anode and cathode reactions in a direct formic acid fuel cell are shown in the following equations:

Anode reaction: $HCOOH \rightarrow 2H^+ + CO_2 + 2e^-$

Cathode reaction: $\frac{1}{2}O_2 + 2H^+ + 2e^- \rightarrow H_2O$

Overall reaction: $HCOOH + \frac{1}{2}O_2 \rightarrow CO_2 + H_2O$

The protons formed at the anode electrocatalyst migrate through the ion-exchange membrane from the anode to the cathode, and at the cathode electrocatalyst layer, the oxidant reacts with the protons to form water.

One obstacle to the widespread commercialization of direct fuel cell technology is fuel crossover from the anode to the cathode through the typical proton exchange membranes (such as, for example, perfluorosulfonic acid membranes, of which Nafion® is a commercial brand). Fuel crossover lowers fuel utilization efficiency and also adversely affects the cathode (oxygen-reduction electrode), resulting in poor fuel cell performance. Fuel crossover also reduces the run time for a given amount of fuel and creates excess heat and water on the cathode side of the cells.

Fuel that crosses over avoids reaction at the anode, and thus cannot be exploited for electrical energy. This limits cell efficiency. An additional problem related to crossover is poisoning of the cathode. As fuel crosses over the polymer membrane to the cathode side, it adsorbs onto the cathode catalyst and thereby blocks reaction sites. Efficiency of the cell is thereby reduced. A proposed solution to this problem has been to provide additional catalyst. This adds expense; however, particularly when considering that costly precious and semi-precious metal catalysts such as platinum are often employed.

Because of this high crossover, methanol and other alcohol fuel cells typically operate with a fuel concentration of no more than about 3-8% by weight. The use of those dilute solutions creates additional problems. This low fuel concentration requires relatively large amounts of ultra-pure water, typically provided through recycling systems including pumps and filters. Also, the concentration of the fuel should be closely monitored and controlled, with the result that sensors and controllers may be required. This peripheral equipment adds cost, complexity, weight, and size to direct organic fuel cells. This required peripheral water management equipment substantially limits the usefulness of direct methanol fuel cells for applications where size and weight become important. For portable, miniature, and microelectronics applications, for example, the size, weight, and complexity of the required peripheral equipment make use of direct fuel cells impractical.

Further, the dilute solutions freeze and expand at temperatures potentially encountered in many fuel cell applications, with portable devices for use outside as an example. The expansion can lead to device failure. Conduit et al. U.S. Pat. No. 6,528,194 teaches that the freezing can be avoided by circulating heated fluid through the fuel tank when the fuel cell is not operating. However, that wastes power and adds complexity.

Proton exchange membranes with low liquid fuel permeation (or low crossover) can allow the use of liquid fuels with high concentration. The ability to use a fuel in a higher concentration increases the energy density available from a direct fuel cell, which is particularly attractive for portable electronic applications such as cellular telephones, personal digital assistants, laptop computers, and handheld gaming platforms. The crossover of formic acid has generally been demonstrated to be lower than the crossover of methanol. Nonetheless, the use of formic acid concentrations higher than 10M could also lead to an unacceptable level of fuel loss with typical Nafion® proton-conducting membranes.

SUMMARY OF THE INVENTION

Several shortcomings of the membranes for use with direct fuel cells are overcome by the present composite polymer electrolyte membranes and electrode assemblies for reducing fuel crossover in direct liquid feed fuel cells. Such a membrane used in connection with direct fuel cells are able to achieve a reasonably low liquid fuel crossover rate while using a high fuel concentration.

In one embodiment, a composite proton exchange membrane comprises:
  (a) first and second outer proton exchange membrane layers each having an exterior peripheral portion;
  (b) an inner proton exchange membrane layer interposed between the first and second outer membrane layers, the inner membrane layer having an exterior peripheral portion encompassed within each of the outer membrane layer peripheral portions; and
  (c) a substantially fluid-impermeable edge bonding film interposed between the first and second outer membrane layers, the edge bonding film circumscribing the inner membrane layer peripheral portion and disposed within each of the outer membrane layer peripheral portions, the edge bonding film cooperating with the first and second outer membrane layers to encapsulate the inner layer.

In preferred embodiments, one or more of the membrane layers comprises perfluorosulfonic acid polymer or sulfonated poly(ether ether ketone) (abbreviated "SPEEK"). In more preferred embodiments, one or more of the membrane layers comprises a perfluorosulfonic acid polymer or sulfonated poly(ether ether ketone) that has been post-polymerized with poly(furfuryl alcohol), poly(furan carbinol), poly(furfuryl acetate), or polyalkenylfuran.

In a preferred embodiment, a hydrophobic polymer layer is interposed between the inner membrane layer and one of the outer membrane layers, the hydrophobic layer having an exterior peripheral portion substantially coextensive with the inner membrane layer peripheral portion. In another preferred embodiment, a first hydrophobic polymer layer is interposed between the inner membrane layer and one of the first and second outer membrane layers, and a second hydrophobic polymer layer is interposed between the inner membrane layer and the other outer membrane layer, each of the hydrophobic polymer layers having an exterior peripheral portion substantially coextensive with the inner membrane layer peripheral portion. In a preferred embodiment, the hydrophobic polymer comprises polytetrafluoroethylene or polyvinylidenefluoride.

In another embodiment, a membrane electrode assembly for a direct liquid feed fuel cell comprises:
  (a) an anode comprising electrically conductive sheet material, the anode having a pair of oppositely-facing major planar surfaces, at least one of the anode major planar surfaces having an interior electrochemically active portion and an exterior peripheral portion;
  (b) a cathode comprising electrically conductive sheet material, the cathode having a pair of oppositely-facing major planar surfaces, at least one of the cathode major planar surfaces having an interior electrochemically active portion and an exterior peripheral portion;
  (c) a composite proton exchange membrane interposed between one of the anode major planar surfaces and one of the cathode major planar surfaces, the composite membrane comprising:
    (1) first and second outer proton exchange membrane layers each having an exterior peripheral portion;
    (2) an inner proton exchange membrane layer interposed between the first and second outer membrane layers, the inner membrane layer having an exterior peripheral portion encompassed within each of the outer membrane layer peripheral portions; and
    (3) a substantially fluid-impermeable edge bonding film interposed between the first and second outer membrane layers, the edge bonding film circumscribing the inner membrane layer peripheral portion, the edge bonding film cooperating with the first and second outer membrane layers to encapsulate the inner membrane layer.

In another embodiment, a gasketed membrane electrode assembly for a direct liquid feed fuel cell comprises:
  (a) an anode comprising electrically conductive sheet material, the anode having a pair of oppositely-facing major planar surfaces, at least one of the anode major planar surfaces having an interior electrochemically active portion and an exterior peripheral portion;

(b) a cathode comprising electrically conductive sheet material, the cathode having a pair of oppositely-facing major planar surfaces, at least one of the cathode major planar surfaces having an interior electrochemically active portion and an exterior peripheral portion;

(c) a composite proton exchange membrane interposed between one of the anode major planar surfaces and one of the cathode major planar surfaces, the composite membrane comprising:

(1) first and second outer proton exchange membrane layers each having an exterior peripheral portion;

(2) an inner proton exchange membrane layer interposed between the first and second membrane layers, the inner membrane layer having an exterior peripheral portion encompassed within each of the outer membrane layer peripheral portions; and (3) a substantially fluid-impermeable edge bonding film interposed between the first and second outer membrane layers, the edge bonding film circumscribing the inner membrane layer peripheral portion and cooperating with the first and second outer membrane layers to encapsulate the inner membrane layer;

(d) a layer of gasketing sheet material overlapping each of the outer membrane layer peripheral portions and circumscribing the inner membrane layers In another embodiment, a reactor comprising a composite proton exchange membrane comprises:

(a) first and second outer proton exchange membrane layers each having an exterior peripheral portion;

(b) an inner proton exchange membrane layer interposed between the first and second outer membrane layers, the inner membrane layer having an exterior peripheral portion encompassed within each of the outer membrane layer peripheral portions; and (c) a substantially fluid-impermeable edge bonding film interposed between the first and second outer membrane layers, the edge bonding film circumscribing the inner membrane layer peripheral portion and disposed within each of the outer membrane layer peripheral portions, the edge bonding film cooperating with the first and second outer membrane layers to encapsulate the inner layer.

In a preferred embodiment, the reactor is a direct liquid feed fuel cell. In another preferred embodiment, the reactor is an electrolysis cell. In another preferred embodiment, the reactor is a reformer for an indirect liquid feed fuel cell. In another preferred embodiment, the proton exchange membrane is rolled to form a spiral.

In another embodiment, a portable electronic device comprising a direct liquid feed fuel cell comprising a composite proton exchange membrane comprises:

(a) first and second outer proton exchange membrane layers each having an exterior peripheral portion;

(b) an inner proton exchange membrane layer interposed between the first and second outer membrane layers, the inner membrane layer having an exterior peripheral portion encompassed within each of the outer membrane layer peripheral portions; and (c) a substantially fluid-impermeable edge bonding film interposed between the first and second outer membrane layers, the edge bonding film circumscribing the inner membrane layer peripheral portion and disposed within each of the outer membrane layer peripheral portions, the edge bonding film cooperating with the first and second outer membrane layers to encapsulate the inner layer.

DETAILED DESCRIPTION OF PREFERRED EMBODIMENT(S)

A composite membrane assembly is provided with improvements that reduce fuel crossover. In accordance with the present invention, materials and structures are deployed within a membrane electrode assembly (MEA), to inhibit liquid fuel crossover while operating with high fuel concentrations, and maintaining overall cell resistance in an efficient range. Such an MEA can be used within a liquid feed fuel cell system, using organic liquid fuels such as methanol or formic acid.

The present membrane electrode assembly comprises three principal parts: the anode catalyst layer, the cathode catalyst layer and a membrane structure, which are each involved in the production of useable electrochemical power. The protonically conductive membrane structure separates the anode from the cathode and provides a path between the same for ion exchange, thereby allowing current to be drawn from the assembly.

Figure 1:
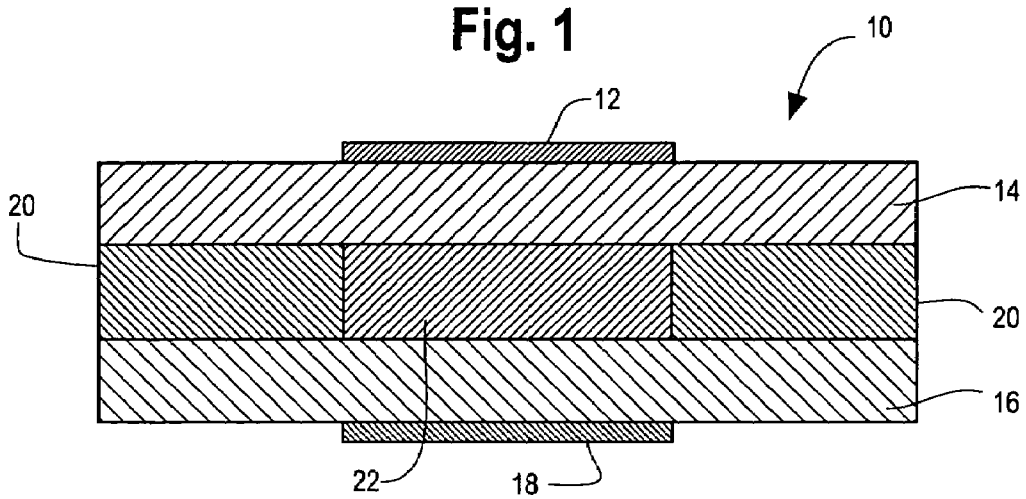
FIG. 1 is a cross-sectional view of a membrane having an edge-bonded impermeable film.

More specifically, FIG. 1 is a cross-section view of the features and structure of a membrane electrode assembly. The figure illustrates one embodiment of the composite membrane of the present invention for purposes of description, though the invention set forth herein can include a number of other components in addition to those shown while remaining within the scope of the present invention. Many alternative membrane structures are within the scope of the present invention, including the use of more outer membranes and inner membranes than shown or described here. Further, the illustrative embodiment of the invention is a membrane for use in a formic acid fuel cell (FAFC) with the fuel substance comprising formic acid. It should be understood, however, that it is within the scope of the invention that other fuels can be used in an appropriate fuel cell. Thus, as used herein, the word fuel shall include methanol, formic acid, ethanol, dimethyloxymethane, methylorthoformate or combinations thereof and aqueous solutions and other carbonaceous substances amenable to use in liquid feed fuel cells and fuel cell systems.

The membrane 10 in FIG. 1 includes anode catalyst layer 12 attached to an outer region of anode proton exchange membrane (PEM) layer 14 and cathode catalyst layer 18 attached to an opposing outer region of cathode PEM layer 16. The PEM layers are protonically conductive membranes such as the perfluorosulfonic membranes commercially available under the trade name Nafion® (DuPont Corporation, Wilmington, Del. USA). Interposed between the PEM layers is an inner PEM layer arranged between the two opposing catalyst layers and substantially similar size or slightly larger than the catalyst layer area, to form an active region. An impermeable edge bonding film 20 with an opening for the inner PEM layer, is contacted around the lateral edges of the inner PEM layer and contacted to the peripheral portions of the two PEM outer layers to encapsulate the inner PEM layer, eliminating fuel leaks through the edges of the MEA electrode area from anode to cathode. One method of assembly is to assemble the layers like a sandwich by providing edge-bonding film 20 on the inner side of a membrane layer 14 or 16 with an opening matched to the catalyst area, and then inserting the inner membrane into the opening, and adding the opposing outer membrane layer. The membrane is then hot pressed or heat treated to bond the compound structure into a single membrane unit. Alternatively, the edge-bonding film can be added as the final step, by inserting it into the peripheral openings surrounding the inner membrane layer 22. Edge bonding film is impermeable and inert to the fuel and provides sealed interfaces around the periphery of the inner membrane.

In a specific embodiment of membrane 10, the outer and inner membranes are each composed of perfluorosulfonic acid polymer such as Nafion®.

Using highly concentrated fuel is desirable to increase stored energy density, however this increases crossover and membrane corrosion damage especially in the case of formic acid fuel, which is highly corrosive. While the previously described membrane 10 provides benefits over known structures, additional benefit can be provided by treating or coating some or all of the membranes in various combinations, allowing higher concentrations of fuel to be used with further cross-over reduction and increased membrane durability.

Typically, in a proton-conducting polymer electrolyte, proton conductivity depends on the mobility of water molecules according to the transport mechanism ($H^+(H_2O)_n$). In order to inhibit the transport of the fuel molecule (formic acid or/methanol) with high affinity to water, the hydrophilicity of electrolyte directly related to proton conductivity should be decreased. The membrane materials that show lower fuel permeability usually exhibit lower proton conductivity. This problem can be alleviated, while reducing cell resistance, by employing thinner membranes in a fuel cell membrane electrode assembly (MEA). The thinner membranes, however, could potentially lead to poor mechanical strength and long-term stability problems. To overcome these difficulties, we present here an approach involving modified protonically conductive membranes and integral multilayered membranes.

A post-polymerization treatment or modification can be made to a PEM layer formed of perfluorosulfonic acid polymer, to modify the hydrophilic properties, reducing membrane swelling and hence fuel crossover. The hydrophilic ionic channels dispersed in a hydrophobic matrix in a perfluorosulfonic acid polymer membrane can change with operating conditions, for example, channel swelling and subsequent increase in fuel crossover. The modification of the hydrophilic channels by in situ polymerization in the channels has been found to alter the hydrophilic properties, restrict the channel size, reduce the swelling rate of the membrane, and therefore reduce formic acid crossover of the modified membrane. At the same time, the membrane conductivity is not significantly decreased. The modification is achieved by cross-linking the membrane with chemically resistant polymers, selected to resist the liquid fuel composition used with the membrane. The post-polymerization results in modifications through the volume of treated membrane and not just at the surface, the term post-polymerization is appropriate as an existing polymer membrane has the mobility of polymer chains altered in-situ.

The class of chemically resistant polymers and specifically acid-resistant polymers applied to perfluorosulfonic acid polymer membranes for the post-polymerization modification includes, poly(furfuryl alcohol), polyfuran, poly(furan carbinol), poly(furfuryl acetate) and polyalkenylfuran. Preferably, poly(furfuryl) alcohol is used incorporating the cross-linked structures shown below:

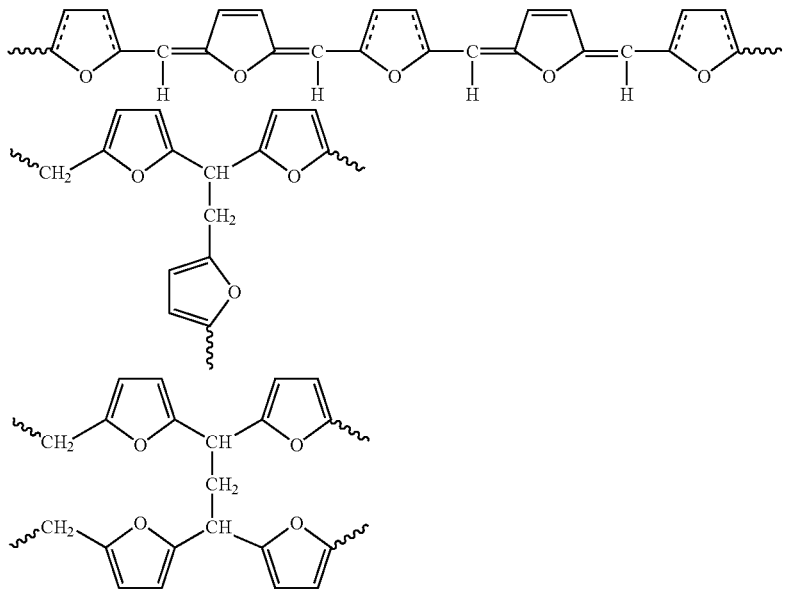

The polymer chains with cross-linked structures make poly(furfuryl alcohol) hydrophobic. The post-polymerization process for the example of poly(furfuryl alcohol) is carried out in absence of oxygen.

The post-polymerization process can be catalyzed by formic acid and hence the poly(furfuryl alcohol) is stable in formic acid solution. Alternatively, the post-polymerization reactions can be catalyzed by different catalysts, such as iodine, tin chloride, ultraviolet light, oxidant, and acid, provided acceptable stability with the selected fuel is maintained. An exemplary method for post-polymerization includes the following steps:

(a) forming a precursor solution of furfuryl alcohol (about 5% to about 60% by weight), water (about 20% to about 80% by weight), and ethanol (about 20% to about 80% by weight);

(b) soaking sodium-form Nafion® membranes in the precursor solution for between about 1 and about 24 hours;

(c) initiating a post-polymerization reaction by transferring the precursor-soaked membranes into a solution of catalyst (about 1% to about 80% by weight formic acid solution);

(d) soaking the catalyst-containing membranes in a solution of ethanol (about 50% to about 100% by weight) for about 1 minute to about 360 minutes;

(e) finalizing the post-polymerization reaction by placing the membranes in vacuum oven (in absence of oxygen) at an elevated temperature (about 30° C. to about 120° C.) for about 1 hour to about 24 hours;

(f) boiling the membranes in about 1% to about 50% by weight sodium hydroxide solution for at least 1 hour at about 30° C. to about 100° C.; and (g) repeating steps (b) through (f) as necessary or desirable, until the post-polymerized Nafion® membranes are capable of reducing fuel crossover in fuel cells.

The resulting poly(furfuryl alcohol) modified Nafion® membrane can be used as inner membrane 22 in composite membrane 10. The modified Nafion® membrane is fairly stable in formic acid solution because its polymerization is catalyzed by acid. In an alternate embodiment, the modified perfluorosulfonic acid polymer membrane can be substituted for outer membranes and inner membrane shown in FIG. 1, or combinations of modified and unmodified membranes. Preferably, the inner membrane is thinner than the outer membranes for reduced resistance.

A second class of solutions includes adding impermeable (hydrophobic) coatings on the inner and/or outer membranes in the "active" area, within a similar compound membrane structure using edge-bonded film. The hydrophobic barrier layers block liquid fuel permeation. Preferably the layers are formed of polytetrafluoroethylene (PTFE) coated on perfluorosulfonic acid polymer membrane. Alternate materials include PVDF (polyvinylidene fluoride). Exemplary hydrophobic coating membrane structures are shown in FIG. 2-9.

Figure 2:
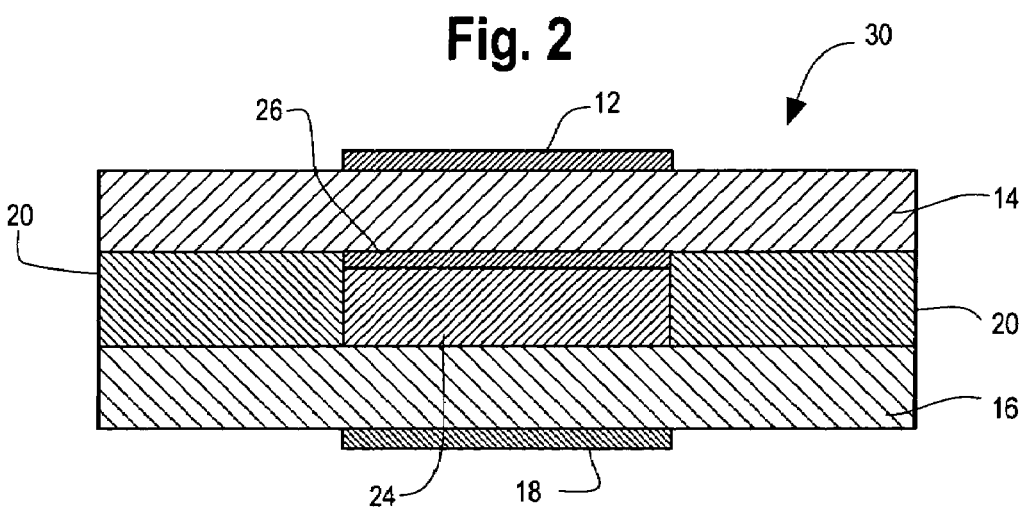
FIG. 2 is a cross-sectional view of a membrane having an edge-bonded impermeable film and a hydrophobic layer underneath an anode membrane and covering an inner membrane portion.
Figure 3:
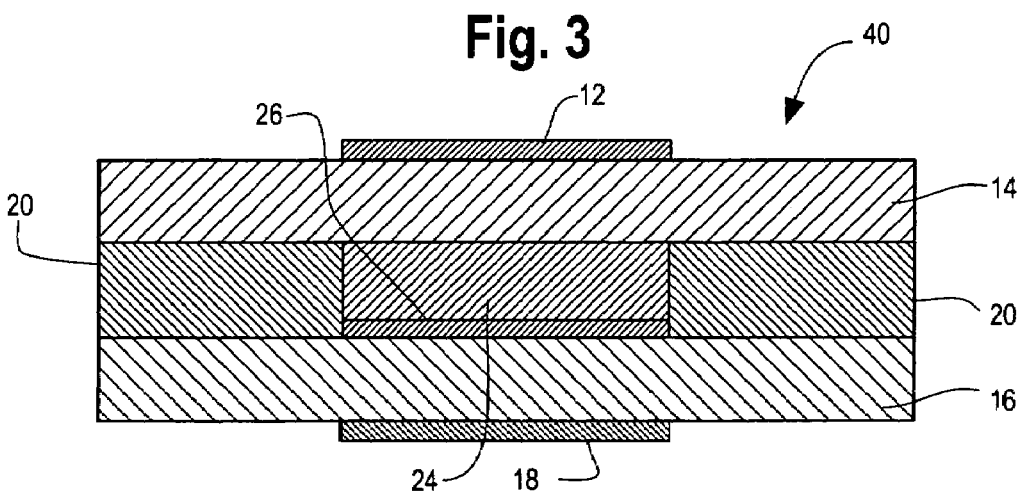
FIG. 3 is a cross-sectional view of a membrane having an edge-bonded impermeable film and a hydrophobic layer above a cathode membrane and covering an inner membrane portion.

An embodiment with a single hydrophobic layer is illustrated in FIG. 2. Hydrophobic layer 26 is coated on inner membrane 24 of MEA 30, closest to the anode PEM membrane 14. The hydrophobic layer should be ionically conductive. Preferably, the hydrophobic layer is PTFE formed as a coating on perfluorosulfonic acid polymer inner membrane. The coated inner membrane is encapsulated by impermeable edge-bonding film 20 as described previously. This structure can be called a single-sided hydrophobic barrier coated inner membrane. FIG. 3 shows a compound membrane 40 with the single hydrophobic layer 26 on the bottom of the inner membrane 24, in proximity to the cathode PEM layer 16.

Figure 4:
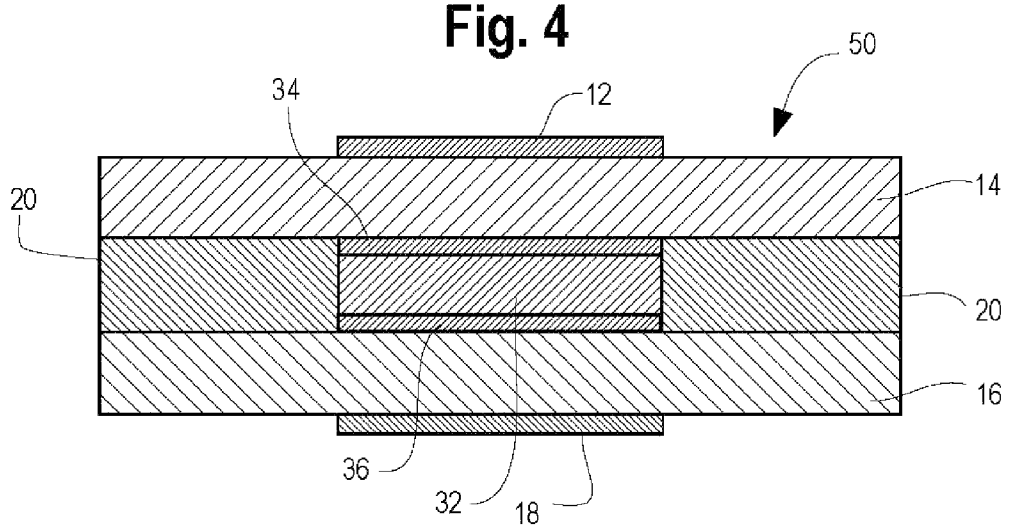
FIG. 4 is a cross-sectional view of a membrane having an edge-bonded impermeable film and two hydrophobic layers covering top and bottom of an inner membrane portion.

A compound membrane 50 with two hydrophobic layers on either side of the inner membrane is illustrated in FIG. 4. Inner membrane 32 is coated on two sides with a hydrophobic coating such as PTFE, and then assembled with the encapsulated edge-bonded film 20 to provide a sealed active region with reduced fuel cross-over. Of the hydrophobic coating embodiments, this is a preferred structure, as the symmetry provides a more stable zone and fuel concentration gradient is minimized or reduced, thereby reducing fuel crossover.

Figure 5:
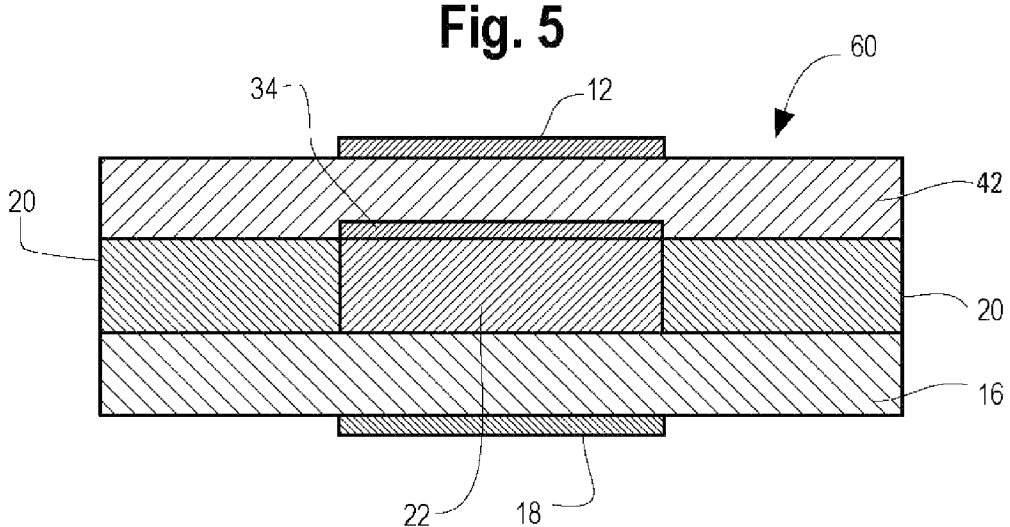
FIG. 5 is a cross-sectional view of a membrane having an edge-bonded impermeable film and a hydrophobic layer within or on the anode membrane and covering the inner membrane portion.
Figure 6:
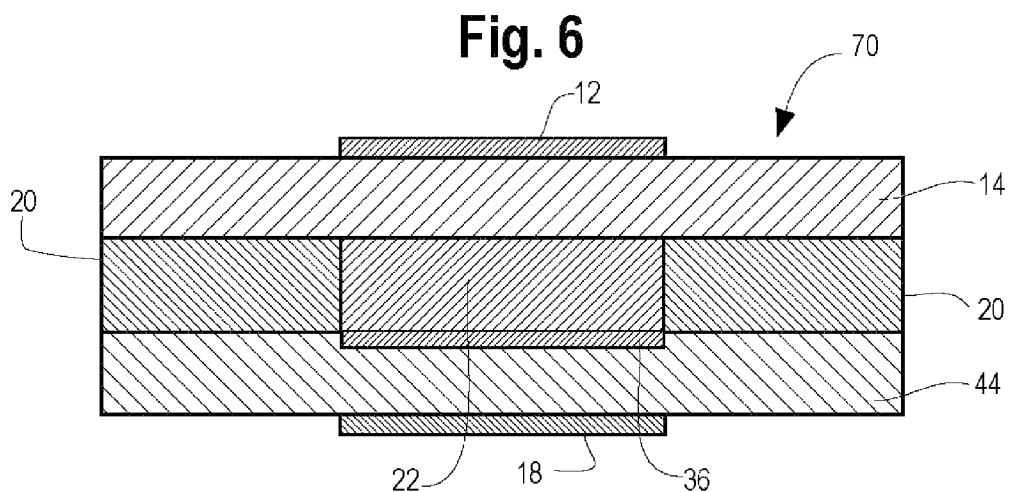
FIG. 6 is a cross-sectional view of a membrane having an edge-bonded impermeable film and a hydrophobic layer within or on a cathode membrane and covering inner membrane portion.
Figure 7:
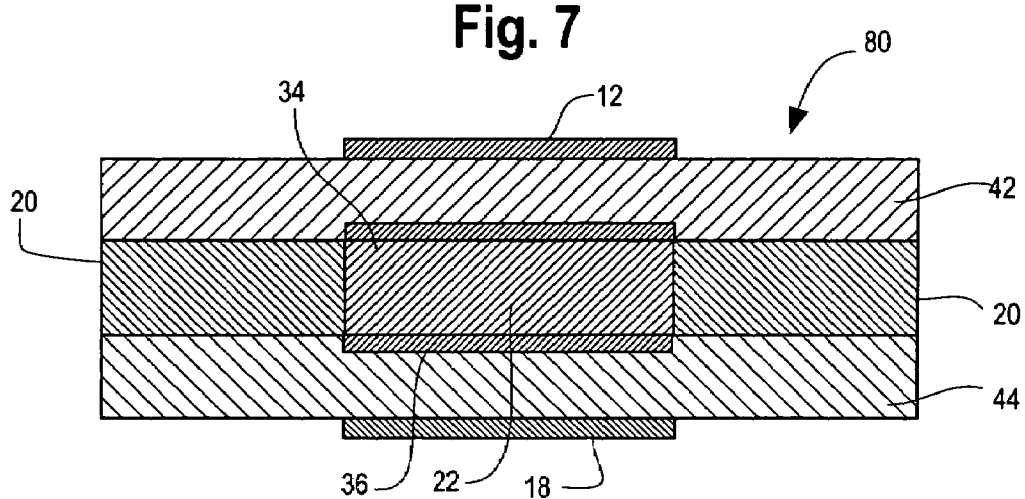
FIG. 7 is a cross-sectional view of a membrane having an edge-bonded impermeable film and two hydrophobic layers within or on the anode and cathode layers.

Alternate embodiments can have the hydrophobic layer located within or on the outer membrane layers as illustrated in FIGS. 5-7 In FIG. 5, the hydrophobic layer 34 is shown within a recess in the anode PEM layer 42, matched to the active area size and overlaying the inner membrane 22 as part of composite membrane 60. In this example edge-bonding film does not encapsulate the edges of the hydrophobic layer 34. Alternatively, the hydrophobic layer could be a coating covering the full side of the anode PEM layer without a recess. In FIG. 6, the hydrophobic layer or coating 36 is shown within a recess in the cathode PEM layer 44 matched to the active area size and overlaying the inner membrane 22, as part of composite membrane 70. Similarly, the hydrophobic layer could be a coating covering the full side of the anode PEM layer without being recessed. In FIG. 7, two hydrophobic layers 34 and 36 are shown recessed into respective anode and cathode PEM layers 42 and 44. The compound membrane 80 is assembled in a similar manner as previously described.

Figure 8:
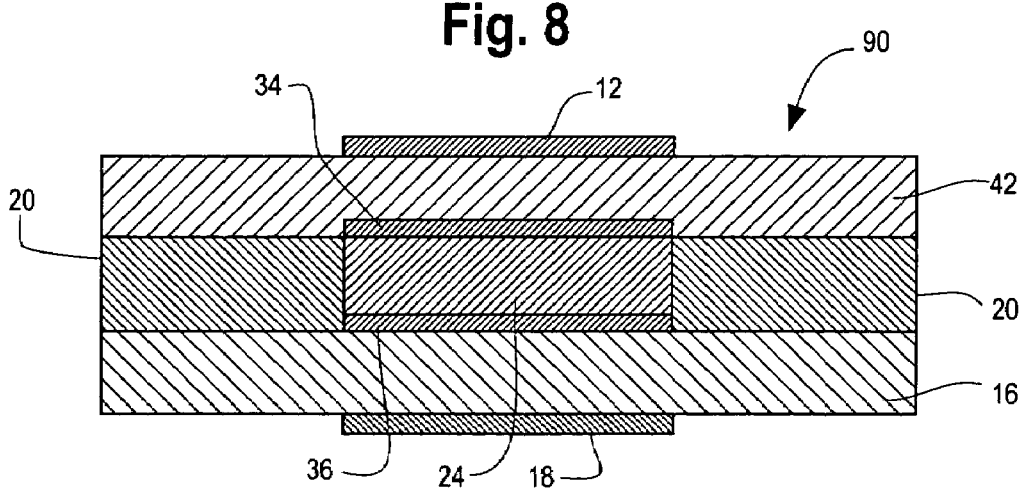
FIG. 8 is a cross-sectional view of a membrane having an edge-bonded impermeable film and a top hydrophobic layer within or on an anode membrane and a bottom hydrophobic layer covering the inner membrane portion.
Figure 9:
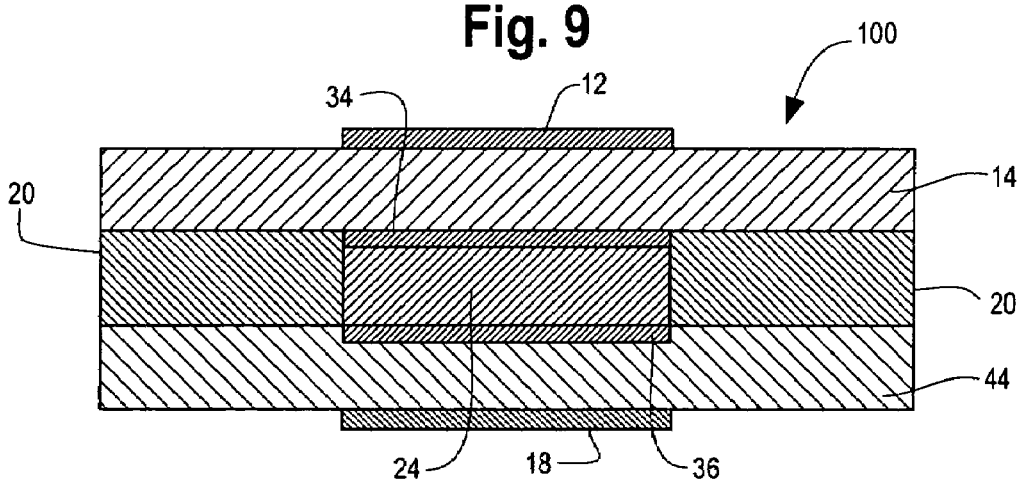
FIG. 9 is a cross-sectional view of a membrane having an edge-bonded impermeable film and a bottom hydrophobic layer within or on a cathode membrane and a top hydrophobic layer covering the inner membrane portion.

Composite structures with two hydrophobic layers are illustrated in FIGS. 8 and 9. FIG. 8 illustrates a composite membrane 90 with the anode side hydrophobic layer 34 recessed in the anode PEM layer 42, and the cathode side hydrophobic layer 36 coated on the bottom of inner layer 24 as shown. FIG. 9 illustrates a composite membrane 100 with the cathode side hydrophobic layer 36 recessed in the cathode PEM layer 44, and the anode side hydrophobic layer 34 coated on the top of inner layer 24 as shown.

In the examples shown in FIG. 2-9, the outer and inner membranes can be alternately substituted with a post-polymerization modified membrane or suitable hydrocarbon polymer membranes such as polycarbon or SPEEK.

Figure 15:
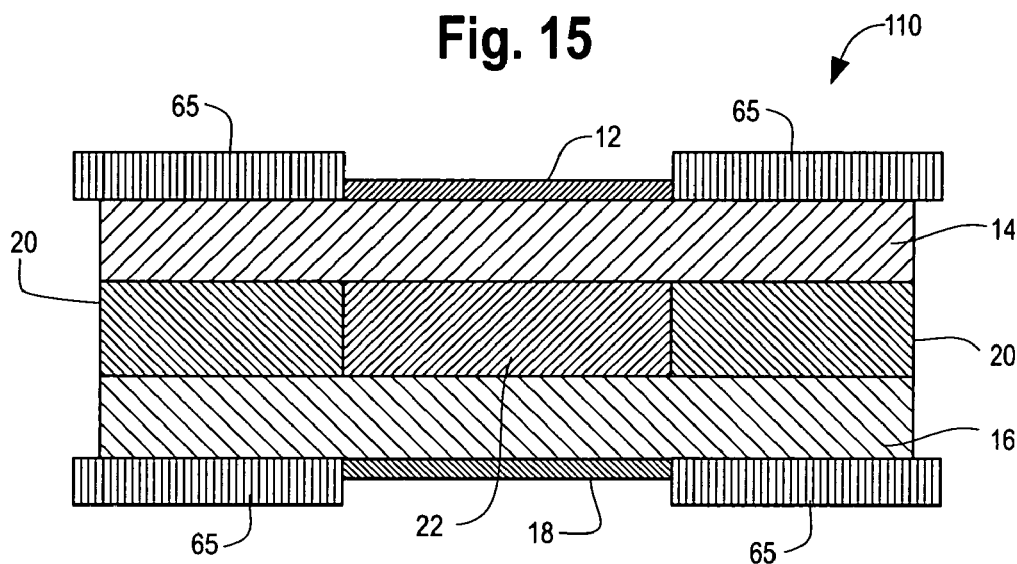
FIG. 15 is a cross-section of a gasket membrane assembly.

The composite membranes disclosed can be assembled as a membrane electrode assembly within a fuel cell, as shown in FIG. 15 with two gaskets 65 on each side of the membrane 110 as shown.

The composite membranes described herein are also ideal for use in a fuel cell system with a liquid fuel reformer using electrochemical methods to convert liquid fuel to hydrogen at the anode side of the composite membrane. Low crossover membrane will results in lower reformate losses and achieve a higher reformer conversion rate. The composite membranes described herein can be used in a fuel cell apparatus, operated in reverse in an electrolysis mode.

Figure 17:
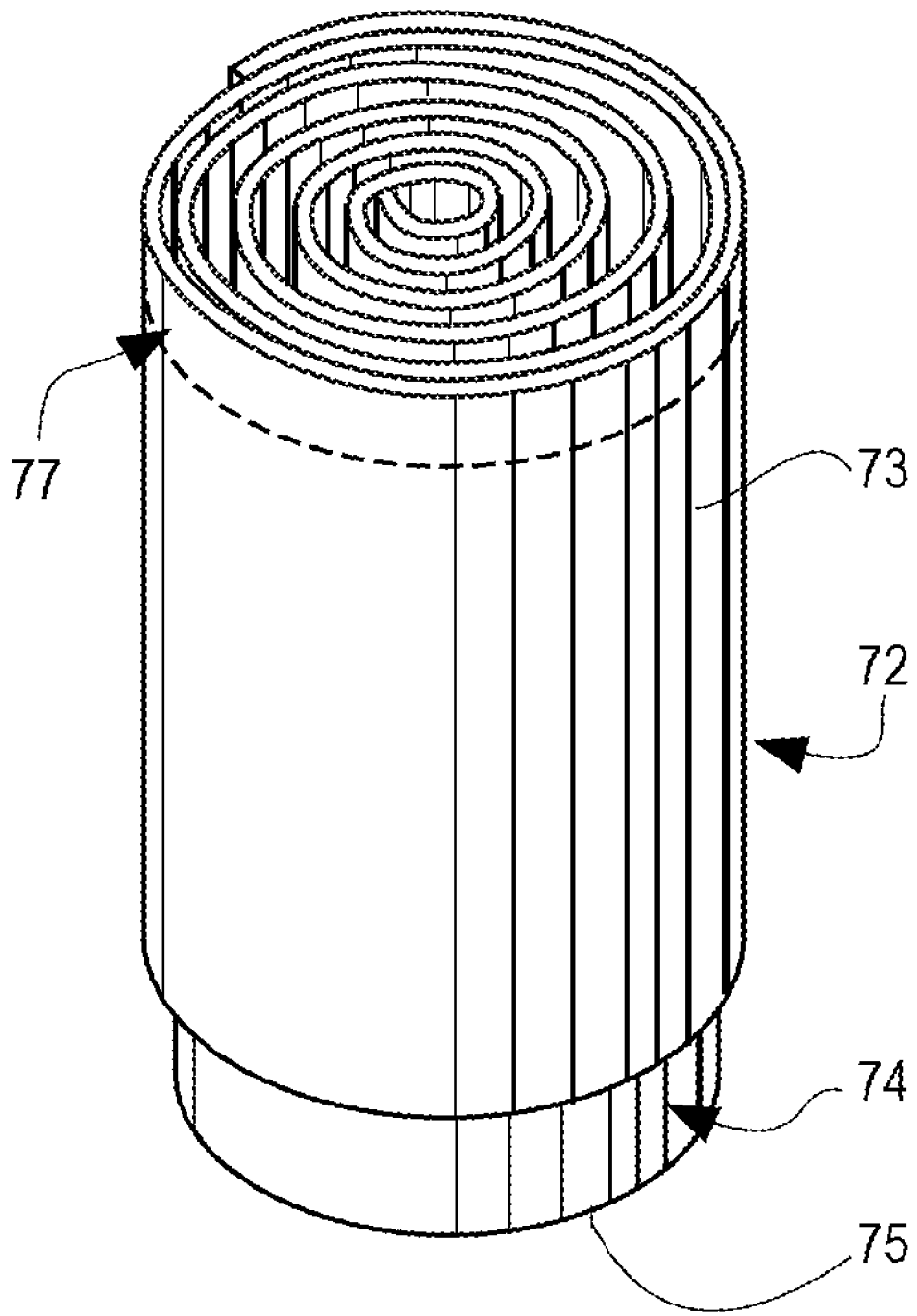
FIG. 17 is a perspective view of a jelly roll configuration of the membrane structures.

The crossover membrane embodiments have been shown as substantially planar, but can be used in non-planar configurations, such as the jelly roll type structure of FIG. 17. Cell 72 is formed by rolling the membrane assembly such that the cathode conductor strip 73 is on the outside and the anode current collector strip 75 is on the inner side. The roll is shown with protruding section 74 as the negative electrode and protruding portion 77 (above the dashed line) as the positive electrode, for illustration.

The performance of formic acid fuel cells using the disclosed composite membranes has been found to have advantages in reduced fuel crossover and extended use with acceptable cell resistance in the range of known membranes. Using post-polymerized perfluorosulfonic acid polymer in a composite membrane was found to reduce fuel crossover at ambient and high temperature operation, and to perform well during extended life testing.

EXAMPLE 1

Improved Performance Of MEAs With Post-Polymerization Modified Membrane Layer In A Compound Membrane With Edge-Bonded Film A study was undertaken to determine whether membrane structures with the post-polymerization membrane, would reduce fuel crossover and leaks. A composite membrane was prepared using the poly(furfuryl alcohol)-modified Nafion® 115 membrane with regular Pd black anode and Pt black cathode catalyst layers being applied. The treatment was to one of the composite Nafion® layers. The fuel was 50% formic acid by weight (formic acid stock obtained from Fluka division of Sigma-Aldrich Co.). The flow rate to the anode was 0.3 ml/min. Air was supplied to the cathode at a flow rate of 200 ml/min at ambient pressure.

Figure 10:
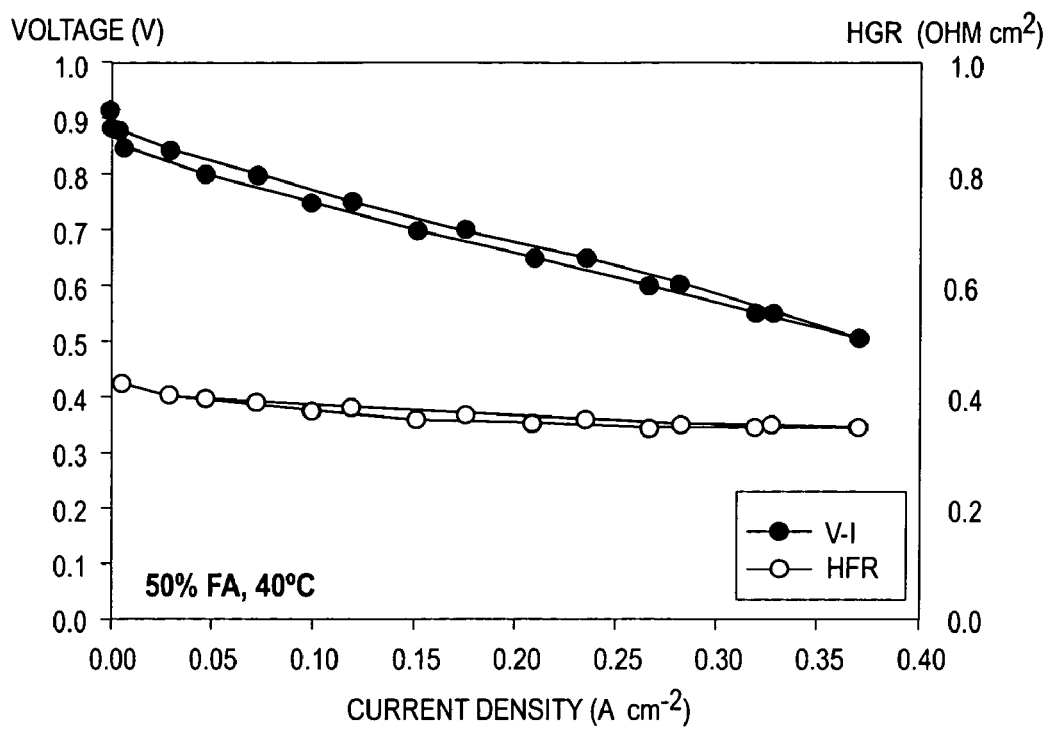
FIG. 10 is a graph of polarization and resistance curves demonstrating the performance of a cross-linked treated Nafion® inner membrane.

The performance was compared to a MEA formed with an untreated Nafion® 115 inner membrane. Very good performance can be achieved in the cell at 40° C. cell temperature. From the polarization curve in FIG. 10, cell voltage was 0.76 V at 0.1 A/cm$^2$ current density and 0.68 V at 0.2 A/cm$^2$ current density. The graph shows both a downward and upward voltage sweep of the same membrane. High frequency resistance of the modified membrane is about 0.35 ohm-cm$^2$ in the V-I polarization measurement. It decreases from 0.35 to 0.3 ohm-cm$^2$ if the cell is operated under constant current, for example, 100 mA/cm$^2$. Therefore, the cross-over benefits are achieved without significant increase in cell resistance, and with similar cell performance to untreated membrane.

Figure 11:
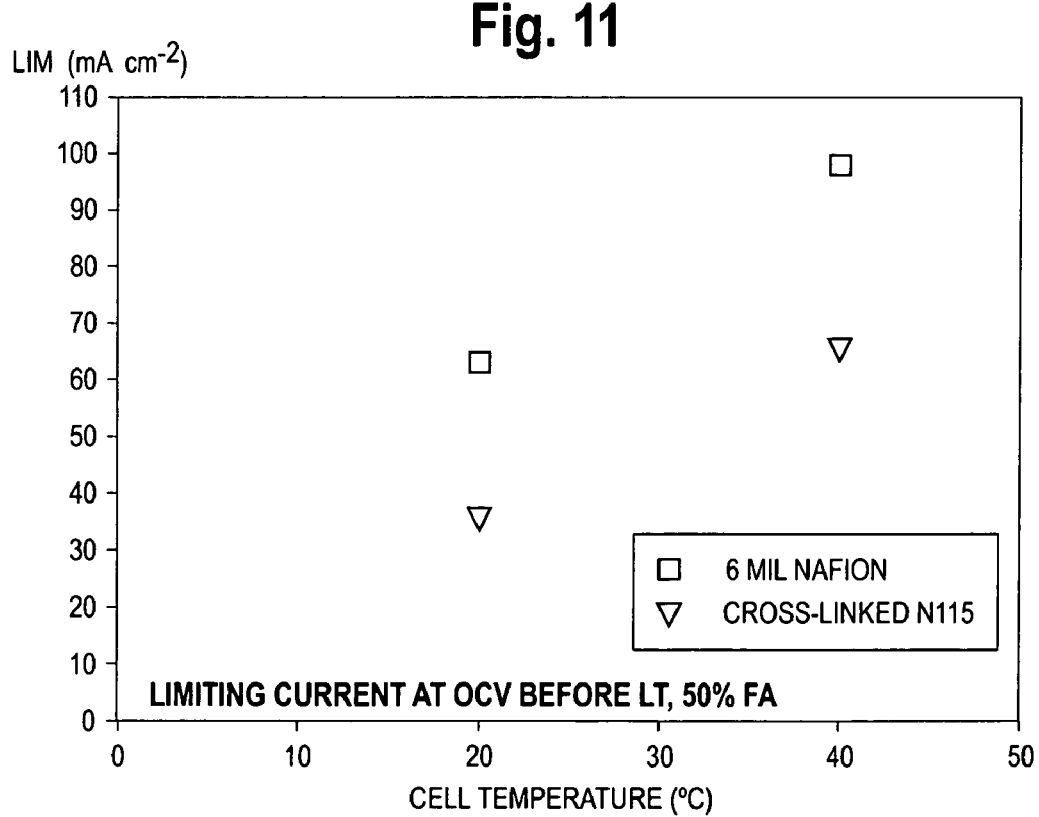
FIG. 11 is a graph of limiting current density as a function of cell temperature, comparing the cross-linked treated membrane to an untreated membrane.

To evaluate formic acid crossover in the fuel cell test fixture, the cells were operated in an external power supply-driven mode, and the crossover formic acid was oxidized at the fuel cell cathode under flowing nitrogen gas at a rate of 300 ml/min. A linearly voltammetric scan was applied to the fuel cell cathode and oxidation current response of crossed-over formic acid at fuel cell cathode is recorded. This measurement allows direct determination of magnitude of crossover of membrane using limiting current density. The limiting current density is reached as soon as the reaction on the cathode surface is so fast in comparison to mass transport that the concentration at the electrode surface sinks to zero. The limiting current density is then linearly proportional to bulk concentration (mol/m$^3$) in the electrolyte membrane layer, representing a proxy measurement for the fuel cross-over. The working potential was controlled with an external power supply. The results of the limiting current tests are shown in FIG. 11, comparing a 6 mm thick Nafion® membrane in the edge-bonded configuration with a 5 mm thick treated Nafion® membrane. The modified composite membrane (cross-linked Nafion® 115) demonstrated greater than 40% reduction in fuel cross-over, at both moderate and high cell temperatures (representing moderate and high cell power). Further, the reduction is demonstrated at higher than normal fuel concentrations. As fuel crossover typically represents the dominant fuel loss in a direct liquid feed fuel cell, this result is an improvement in higher performance liquid fuel cells.

Figure 12:
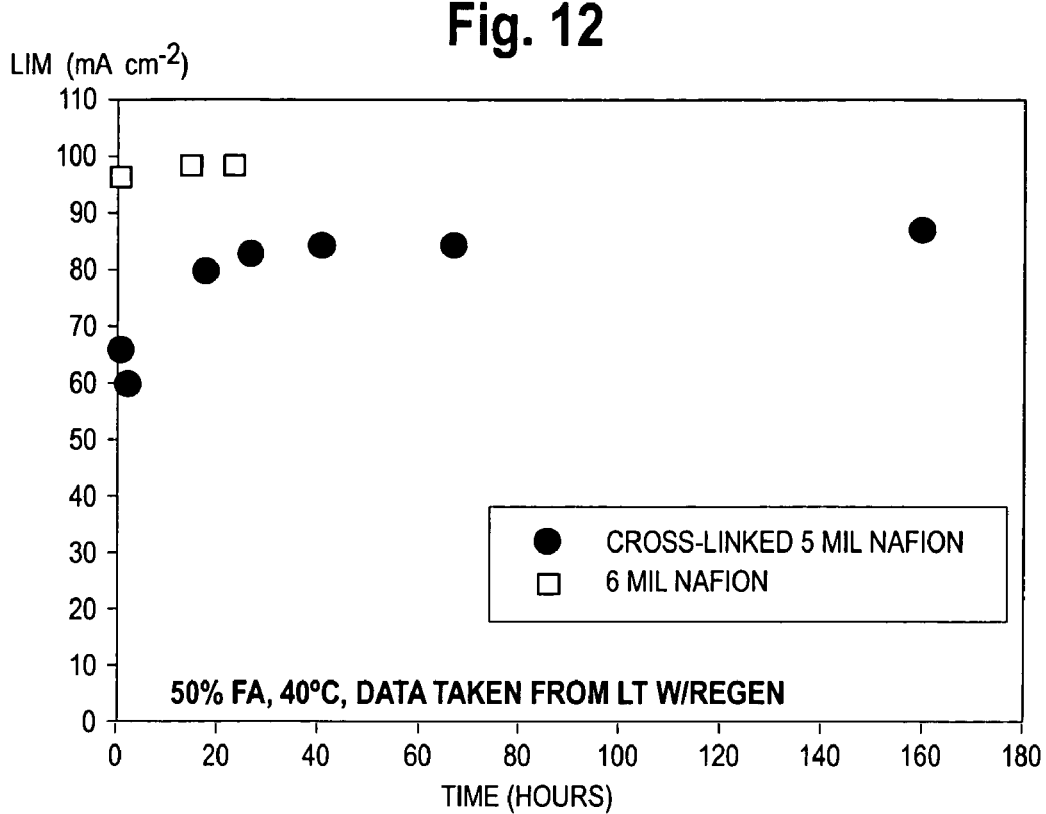
FIG. 12 is a graph of limiting current density as a function of time, showing reduced fuel crossover, comparing the cross-linked treated membrane to an untreated membrane.

To show that the composite membrane is durable and corrosion-resistant to formic acid fuel, the fuel crossover was determined by measuring limiting current density periodically during a continuous operation as shown in FIG. 12, at a cathode supply of 300 ml/min flowing nitrogen gas. The limiting current density was periodically evaluated during a long term test over 160 hours at a constant current density of 100 mA/cm$^2$. A periodical voltage pulse of 1.6 V was applied to the anode for one second every 5 minutes. The cell was operated at 40° C. The limiting current density for the treated membrane decreases from 66 to 60 mA/cm$^2$ in 2 hours, then increases to about 80 mA/cm$^2$ in 18 hours, and then stabilizes at about 85 mA/cm in the time period of about 18 to about 160 hours. This limiting current density is lower than that shown for the untreated Nafion® membrane (6 mm). The baseline untreated Nafion® stabilized faster and hence was not measured after 22 hours. The thinner treated membrane (5 mm) has significantly lower crossover than the thicker untreated membrane (6 mm). The treated membrane reduces fuel crossover with a slight decrease in crossover reduction over longer test cycles.

Figure 16:
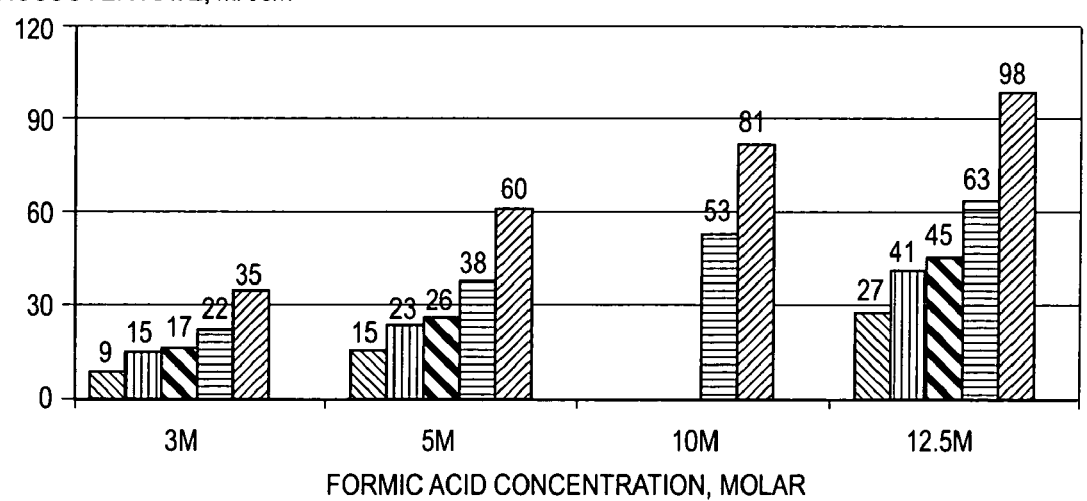
FIG. 16 is a graph demonstrating reduction in fuel crossover comparing treated to untreated membrane, versus a baseline untreated membrane.

Further test data is shown in FIG. 16, comparing the treated cross-linked membrane to an untreated membrane for a range of cell temperatures and fuel concentrations. The untreated 6 mm Nafion® membrane (the membrane configuration is shown in FIG. 1) has an almost identical fuel crossover to a regular Nafion® 117 (7 mm). The treated membrane shows reduction of fuel crossover by more than 50% across a wide range of formic acid fuel concentrations. The results demonstrate that the membrane embodiments operate and reduce crossover, even at high formic acid concentrations.

EXAMPLE 2

Improved Performance Of MEAs With PTFE Coated Membrane Layer In A Compound Membrane With Edge-Bonded Film An additional study was undertaken to determine whether membrane structures with the PTFE coated membrane layer, would improve performance of the MEA by reducing fuel crossover and leaks. A composite membrane was prepared using PTFE coated Nafion® 115 membrane with regular Pd black anode and Pt black cathode catalyst layers being applied. Both single sided (FIG. 2) and double sided (FIG. 4) composite membranes were tested versus an uncoated inner membrane. The fuel was 50% Fluka formic acid by weight. The flow rate to the anode was 0.3 ml/min. Nitrogen gas was supplied to the cathode at a flow rate of 300 ml/min at ambient pressure.

Figure 13:
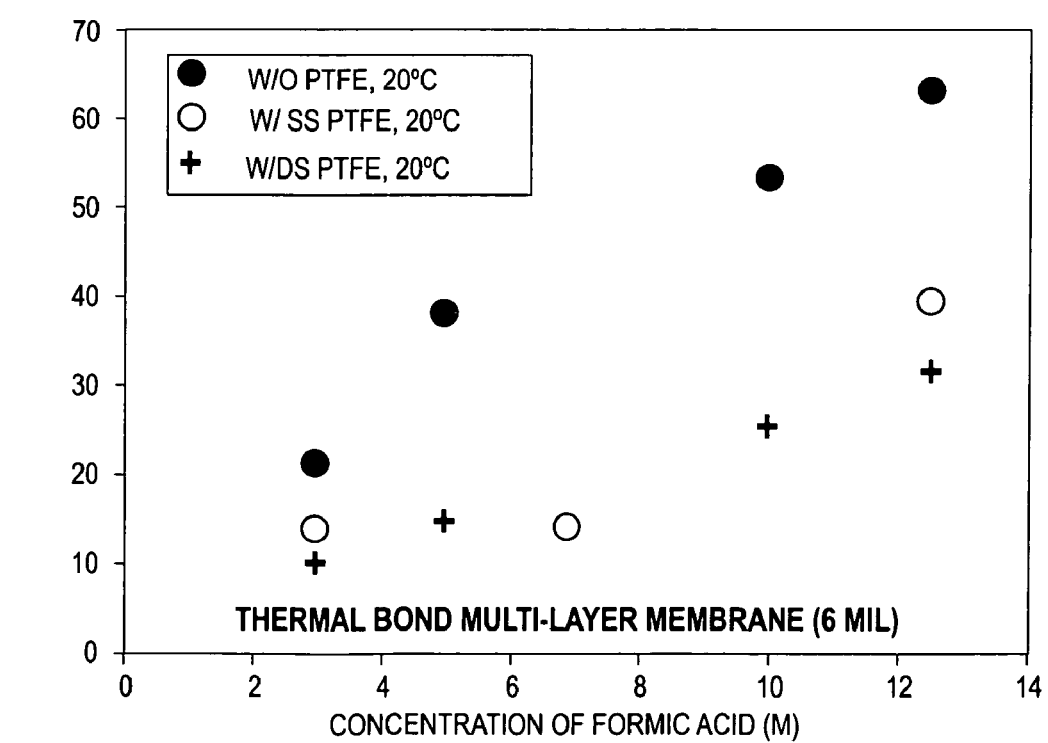
FIG. 13 is a graph of limiting current density as a function of formic acid fuel concentration, comparing three embodiments of the membrane at ambient temperature, and demonstrating the performance of the membrane structure with hydrophobic layers disposed on both sides of the inner membrane.

The formic acid crossover of Nafion® membrane was found to be suppressed using single-sided PTFE coated membrane layer (the membrane configuration is shown in FIG. 2). FIG. 13 shows a graph of limiting current density over a wide usable range of fuel concentrations, for composite membranes with uncoated, single-side coated and double side coated inner membranes. The membrane assemblies tested employed the edge-bonding film. The limiting current densities for the membrane (6 mm) are 14 and 39 mA/cm$^2$ for 3M (Molar) and 12.5M formic acid at 20° C., respectively, which are much lower than that of 21 and 63 mA/cm$^2$ for the multi-layered Nafion® membrane (6 mm) acting as a baseline. Using double-sided PTFE coated Nafion® membrane (as the configuration in FIG. 3), the limiting current densities improve to 11 and 32 mA/cm$^2$ at 20° C., lower than that of 14 and 39 mA/cm$^2$ for the single-sided PTFE coated Nafion® membrane. At cell temperature 40° C., a similar trend was observed. For example at 10M fuel concentration, the fuel crossover was reduced by approximately 50% using a double-sided PTFE coated inner membrane.

Figure 14A:
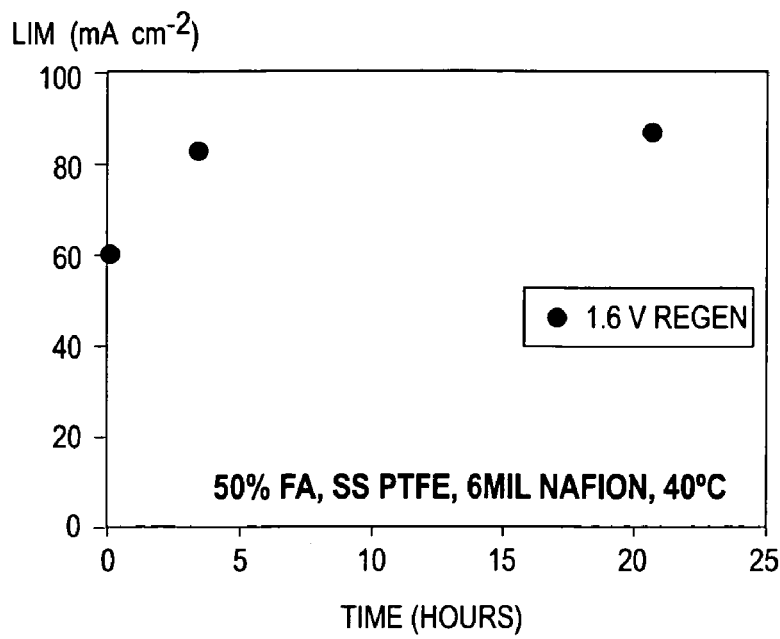
FIG. 14 is a graph of limiting current density as a function of time, showing reduced fuel crossover, comparing the performance of membrane assemblies with (a) a hydrophobic layer coated on one side of the inner membrane to (b) hydrophobic layers coated on both sides of the inner membrane.
Figure 14B:
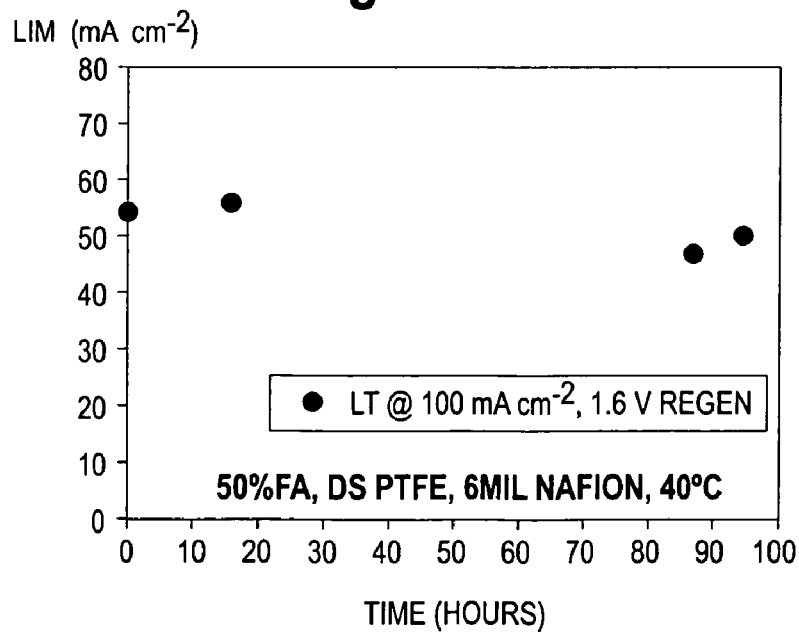

The limiting current density for a composite membrane with both single and double sided PTFE coated inner membrane, was periodically evaluated during long term tests as shown in FIG. 14a and FIG. 14b. The operating tests were done at constant current density of 100 mA/cm$^2$ at cell temperature 40° C. A shorter time scale of 25 hours is shown for the single-sided PTFE coated inner membrane to illustrate the variation occurring during initial portion of the test. The limiting current density increased from 60 to 82 mA/cm$^2$ in 3.5 hours, then maintained a value around 85 mA/cm$^2$ in 22 hours, which was still lower than that of 98 mA/cm$^2$ for the uncoated multi-layer Nafion® membrane (as shown in FIG. 12), but with significant variation under operating conditions. When using double-sided PTFE coated Nafion® membrane, the limiting current densities can be stabilized around 50 mA/cm over 95 hours, as shown in FIG. 14B. The double-sided PTFE coated Nafion® inner membrane is a preferred structure of the coated class of composite membranes and shows a relatively uniform and stable capability to reduce formic acid crossover, over time, during typical operating conditions.

While the invention has been described with respect to preferred embodiments, those skilled in the art will readily appreciate that various changes and/or modifications can be made to the invention without departing from the scope of the invention as defined by the appended claims. All documents cited herein are incorporated by reference herein in their entirety.

What is claimed is:

1. A composite proton exchange membrane comprising:
    (a) first and second outer proton exchange membrane layers each having an exterior peripheral portion;
    (b) an inner proton exchange membrane layer interposed between said first and second outer membrane layers, said inner membrane layer having an exterior peripheral portion encompassed within each of said outer membrane layer peripheral portions; and
    (c) a substantially fluid-impermeable edge bonding film interposed between said first and second outer membrane layers, said edge bonding film circumscribing said inner membrane layer peripheral portion and disposed within each of said outer membrane layer peripheral portions, said edge bonding film cooperating with said first and second outer membrane layers to encapsulate said inner layer.

2. The composite membrane of claim 1, wherein each of said first and second outer membrane layers and said inner membrane layer comprises a compound selected from the group consisting of perfluorosulfonic acid polymer and sulfonated poly(ether ether ketone).

3. The composite membrane of claim 2, wherein said inner membrane layer comprises a perfluorosulfonic acid polymer that has been post-polymerized with a compound selected from the group consisting of poly(furfuryl alcohol), poly(furan carbinol), poly(furfuryl acetate), and polyalkenylfuran.

4. The composite membrane of claim 2, wherein at least one of said outer membrane layers comprises a perfluorosulfonic acid polymer that has been post-polymerized with a compound selected from the group consisting of poly(furfuryl alcohol), poly(furan carbinol), poly(furfuryl acetate), and polyalkenylfuran.

5. The composite membrane of claim 4, wherein said inner membrane layer comprises a perfluorosulfonic acid polymer that has been post-polymerized with a compound selected from the group consisting of poly(furfuryl alcohol), poly(furan carbinol), poly(furfuryl acetate), and polyalkenylfuran.

6. The composite membrane of claim 4, wherein each of said outer membrane layers comprise a perfluorosulfonic acid polymer that has been post-polymerized with a compound selected from the group consisting of poly(furfuryl alcohol), poly(furan carbinol), poly(furfuryl acetate), and polyalkenylfuran.

7. The composite membrane of claim 6, wherein said inner membrane layer comprises a perfluorosulfonic acid polymer that has been post-polymerized with a compound selected from the group consisting of poly(furfuryl alcohol), poly(furan carbinol), poly(furfuryl acetate), and polyalkenylfuran.

8. The composite membrane of claim 1, further comprising a hydrophobic polymer layer interposed between said inner membrane layer and one of said outer membrane layers, said hydrophobic layer having an exterior peripheral portion substantially coextensive with said inner membrane layer peripheral portion.

9. The composite membrane of claim 8, wherein said hydrophobic polymer comprises a compound selected from the group consisting of polytetrafluoroethylene and polyvinylidenefluoride.

10. The composite membrane of claim 8, wherein each of said first and second outer membrane layers and said inner membrane layer comprises a compound selected from the group consisting of perfluorosulfonic acid polymer and sulfonated poly(ether ether ketone).

11. The composite membrane of claim 10, wherein said inner membrane layer comprises a perfluorosulfonic acid polymer that has been post-polymerized with a compound selected from the group consisting of poly(furfuryl alcohol), poly(furan carbinol), poly(furfuryl acetate), and polyalkenylfuran.

12. The composite membrane of claim 10, wherein at least one of said outer membrane layers comprises a perfluorosulfonic acid polymer that has been post-polymerized with a compound selected from the group consisting of poly(furfuryl alcohol), poly(furan carbinol), poly(furfuryl acetate), and polyalkenylfuran.

13. The composite membrane of claim 12, wherein said inner membrane layer comprises a perfluorosulfonic acid polymer that has been post-polymerized with a compound selected from the group consisting of poly(furfuryl alcohol), poly(furan carbinol), poly(furfuryl acetate), and polyalkenylfuran.

14. The composite membrane of claim 12, wherein each of said outer membrane layers comprises a perfluorosulfonic acid polymer that has been post-polymerized with a compound selected from the group consisting of poly(furfuryl alcohol), poly(furan carbinol), poly(furfuryl acetate), and polyalkenylfuran.

15. The composite membrane of claim 14, wherein said inner membrane layer comprises a perfluorosulfonic acid polymer that has been post-polymerized with a compound selected from the group consisting of poly(furfuryl alcohol), poly(furan carbinol), poly(furfuryl acetate), and polyalkenylfuran.

16. The composite membrane of claim 1, further comprising a first hydrophobic polymer layer interposed between said inner membrane layer and one of said first and second outer membrane layers, and a second hydrophobic polymer layer interposed between said inner membrane layer and the other of said first and second outer membrane layers, each of said hydrophobic polymer layers having an exterior peripheral portion substantially coextensive with said inner membrane layer peripheral portion.

17. The composite membrane of claim 16, wherein at least one of said first and second hydrophobic polymer layers comprises a compound selected from the group consisting of polytetrafluoroethylene and polyvinylidenefluoride.

18. The composite membrane of claim 16, wherein each of said first and second outer membrane layers and said inner membrane layer comprises a compound selected from the group consisting of perfluorosulfonic acid polymer and sulfonated poly(ether ether ketone).

19. The composite membrane of claim 18, wherein said inner membrane layer comprises a perfluorosulfonic acid polymer that has been post-polymerized with a compound selected from the group consisting of poly(furfuryl alcohol), poly(furan carbinol), poly(furfuryl acetate), and polyalkenylfuran.

20. The composite membrane of claim 18, wherein at least one of said outer membrane layers comprises a perfluorosulfonic acid polymer that has been post-polymerized with a compound selected from the group consisting of poly(furfuryl alcohol), poly(furan carbinol), poly(furfuryl acetate), and polyalkenylfuran.

21. The composite membrane of claim 20, wherein said inner membrane layer comprises a perfluorosulfonic acid polymer that has been post-polymerized with a compound selected from the group consisting of poly(furfuryl alcohol), poly(furan carbinol), poly(furfuryl acetate), and polyalkenylfuran.

22. The composite membrane of claim 20, wherein each of said outer membrane layers comprises a perfluorosulfonic acid polymer that has been post-polymerized with a compound selected from the group consisting of poly(furfuryl alcohol), poly(furan carbinol), poly(furfuryl acetate), and polyalkenylfuran.

23. The composite membrane of claim 22, wherein said inner membrane layer comprises a perfluorosulfonic acid polymer that has been post-polymerized with a compound selected from the group consisting of poly(furfuryl alcohol), poly(furan carbinol), poly(furfuryl acetate), and polyalkenylfuran.

* * * * *